US008396985B2

(12) United States Patent
Wu

(10) Patent No.: US 8,396,985 B2
(45) Date of Patent: Mar. 12, 2013

(54) PACKET SEQUENCE NUMBER TRACKING FOR AN ANTI-REPLAY WINDOW

(75) Inventor: Ephrem Wu, San Mateo, CA (US)

(73) Assignee: LSI Corporation, Milpitas, CA (US)

( * ) Notice: Subject to any disclaimer, the term of this patent is extended or adjusted under 35 U.S.C. 154(b) by 355 days.

(21) Appl. No.: 12/854,315

(22) Filed: Aug. 11, 2010

(65) Prior Publication Data

US 2012/0042096 A1   Feb. 16, 2012

(51) Int. Cl.
G06F 15/173 (2006.01)
(52) U.S. Cl. ........... 709/238; 370/428; 713/153; 726/13
(58) Field of Classification Search .................... 709/238
See application file for complete search history.

(56) References Cited

U.S. PATENT DOCUMENTS

| 6,262,929 | B1 | 7/2001 | Miyatake et al. | |
|---|---|---|---|---|
| 7,237,262 | B2 | 6/2007 | Lahti et al. | |
| 2004/0062267 | A1* | 4/2004 | Minami et al. ................ | 370/463 |
| 2004/0205332 | A1* | 10/2004 | Bouchard et al. ............. | 713/153 |
| 2007/0294509 | A1 | 12/2007 | Sauer | |
| 2008/0288872 | A1 | 11/2008 | Burkley et al. | |
| 2009/0158417 | A1 | 6/2009 | Khanna et al. | |
| 2012/0042096 | A1* | 2/2012 | Wu .............................. | 709/238 |

OTHER PUBLICATIONS

Internet Engineering Task Force (IETF) Requests for Comment (RFC) 2402, "IP Authentication Header", IETF (1998).
Huang, Chin-Tser and Gouda, Mohamed G., "An Anti-Replay Window Protocol with Controlled Shift", Proceedings of the Tenth International Conference on Computer Communications and Networks, Oct. 15-17, 2001, pp. 242-247, IEEE (USA 2001).

* cited by examiner

Primary Examiner — Hua Fan

(57) ABSTRACT

Described embodiments provide a network processor that includes a security sub-processor to prevent replay attacks on the network processor. A memory stores an anti-replay window corresponding to a data stream of the network processor. The anti-replay window has N bits initialized to correspond to data packet sequence numbers in the range 1 to N. The anti-replay memory is stored in a plurality of data words. A plurality of flip-flops store word valid bits corresponding to each of the data words. A multiplexer selects the word valid bit corresponding to a data word requested by the security processor, and an AND gate performs a bitwise AND operation between the selected data word and word valid bit. When the network processor receives a data packet, the security sub-processor determines a value of the received sequence number with respect to minimum and maximum values of a sequence number range of the anti-replay window.

8 Claims, 13 Drawing Sheets

FIG. 2
200

| WORD INDEX | ANTI-REPLAY WINDOW ||||||| WORD VALID BIT |
|---|---|---|---|---|---|---|---|---|
| | SEQUENCE NUMBER INDEX |||||||  |
| 0 | 0 | 0 | ... | 0 | 0 | 0 | 0 | 1 |
| 1 | 0 | 0 | ... | 0 | 0 | 0 | 0 | 1 |
| 2 | 0 | 0 | ... | 0 | 0 | 0 | 0 | 1 |
| 3 | 0 | 0 | ... | 0 | 0 | 0 | 0 | 1 |
| 4 | 0 | 0 | ... | 0 | 0 | 0 | 0 | 1 |
| 5 | 0 | 0 | ... | 0 | 0 | 0 | 0 | 1 |
| 6 | 0 | 0 | ... | 0 | 0 | 0 | 0 | 1 |
| 7 | 0 | 0 | ... | 0 | 0 | 0 | 0 | 1 |
| BIT INDEX | 63 | 62 | ... | 3 | 2 | 1 | 0 | |

FIG. 8
200

FIRST PACKET RECEIVED

NEWLY RECEIVED PACKET SEQUENCE NUMBER = 129

MAXIMUM RECEIVED SEQUENCE NUMBER = 129

ANTI-REPLAY RANGE = 1-512

| WORD INDEX | ANTI-REPLAY WINDOW SEQUENCE NUMBER INDEX | | | | | | | | WORD VALID BIT |
|---|---|---|---|---|---|---|---|---|---|
| 0 | 0 | 0 | ... | 0 | 0 | 0 | 0 | 0 | 1 |
| 1 | 0 | 0 | ... | 0 | 0 | 0 | 0 | 0 | 1 |
| 2 | 0 | 0 | ... | 0 | 0 | 0 | 0 | 1 | 1 |
| 3 | 0 | 0 | ... | 0 | 0 | 0 | 0 | 0 | 1 |
| 4 | 0 | 0 | ... | 0 | 0 | 0 | 0 | 0 | 1 |
| 5 | 0 | 0 | ... | 0 | 0 | 0 | 0 | 0 | 1 |
| 6 | 0 | 0 | ... | 0 | 0 | 0 | 0 | 0 | 1 |
| 7 | 0 | 0 | ... | 0 | 0 | 0 | 0 | 0 | 1 |
| BIT INDEX | 63 | 62 | ... | 3 | 2 | 1 | 0 | | |

FIG. 9
200

SECOND PACKET RECEIVED

NEWLY RECEIVED PACKET SEQUENCE NUMBER = 511

MAXIMUM RECEIVED SEQUENCE NUMBER = 511

ANTI-REPLAY RANGE = 1–512

| WORD INDEX | ANTI-REPLAY WINDOW SEQUENCE NUMBER INDEX | | | | | | | | WORD VALID BIT |
|---|---|---|---|---|---|---|---|---|---|
| 0 | 0 | 0 | 0 | ... | 0 | 0 | 0 | 0 | 1 |
| 1 | 0 | 0 | 0 | ... | 0 | 0 | 0 | 0 | 1 |
| 2 | 0 | 0 | 0 | ... | 0 | 0 | 0 | 1 | 1 |
| 3 | 0 | 0 | 0 | ... | 0 | 0 | 0 | 0 | 1 |
| 4 | 0 | 0 | 0 | ... | 0 | 0 | 0 | 0 | 1 |
| 5 | 0 | 0 | 0 | ... | 0 | 0 | 0 | 0 | 1 |
| 6 | 0 | 0 | 0 | ... | 0 | 0 | 0 | 0 | 1 |
| 7 | 0 | 1 | 0 | ... | 0 | 0 | 0 | 0 | 1 |
| BIT INDEX | 63 | 62 | ... | ... | 3 | 2 | 1 | 0 | |

FIG. 10
200

ANTI-REPLAY WINDOW

| WORD INDEX | SEQUENCE NUMBER INDEX | | | | | | | | WORD VALID BIT |
|---|---|---|---|---|---|---|---|---|---|
| 0 | 0 | 0 | 0 | ... | 0 | 0 | 0 | 0 | 1 |
| 1 | 0 | 0 | 0 | ... | 0 | 0 | 0 | 0 | 1 |
| 2 | 0 | 0 | 0 | ... | 0 | 0 | 0 | 1 | 1 |
| 3 | 0 | 0 | 0 | ... | 1 | 0 | 0 | 0 | 1 |
| 4 | 0 | 0 | 0 | ... | 0 | 0 | 0 | 0 | 1 |
| 5 | 0 | 0 | 0 | ... | 0 | 0 | 0 | 0 | 1 |
| 6 | 0 | 0 | 0 | ... | 0 | 0 | 0 | 0 | 1 |
| 7 | 0 | 1 | 0 | ... | 0 | 0 | 0 | 0 | 1 |
| BIT INDEX | 63 | 62 | ... | ... | 3 | 2 | 1 | 0 | |

THIRD PACKET RECEIVED

NEWLY RECEIVED PACKET SEQUENCE NUMBER = 196

MAXIMUM RECEIVED SEQUENCE NUMBER = 511

ANTI-REPLAY RANGE = 1-512

FIG. 11
200

FOURTH PACKET RECEIVED

NEWLY RECEIVED PACKET SEQUENCE NUMBER = 707

MAXIMUM RECEIVED SEQUENCE NUMBER = 707

ANTI-REPLAY RANGE = 196–707

| WORD INDEX | ANTI-REPLAY WINDOW SEQUENCE NUMBER INDEX | | | | | | | | WORD VALID BIT |
|---|---|---|---|---|---|---|---|---|---|
| 0 | 63 | 62 | ... | 0 | 0 | 0 | 0 | 0 | 0 |
| 1 | 0 | 0 | ... | 0 | 0 | 0 | 0 | 0 | 0 |
| 2 | 0 | 0 | ... | 0 | 0 | 0 | 0 | 0 | 0 |
| 3 | 0 | 0 | ... | 1 | 1 | 0 | 0 | 1 | 0 |
| 4 | 0 | 0 | ... | 0 | 0 | 0 | 0 | 0 | 1 |
| 5 | 0 | 0 | ... | 0 | 0 | 0 | 0 | 0 | 1 |
| 6 | 0 | 0 | ... | 0 | 0 | 0 | 0 | 0 | 1 |
| 7 | 0 | 1 | ... | 3 | 2 | 1 | 0 | 0 | 1 |
| BIT INDEX | 63 | 62 | ... | 3 | 2 | 1 | 0 | | |

FIG. 12
200

FIFTH PACKET RECEIVED

NEWLY RECEIVED PACKET SEQUENCE NUMBER = 84

MAXIMUM RECEIVED SEQUENCE NUMBER = 707

ANTI-REPLAY RANGE = 196–707

| WORD INDEX | ANTI-REPLAY WINDOW SEQUENCE NUMBER INDEX | | | | | | | | WORD VALID BIT |
|---|---|---|---|---|---|---|---|---|---|
| 0 | 63 | 0 | ... | 0 | 0 | 0 | 0 | 0 | 0 |
| 1 | 0 | 0 | ... | 0 | 0 | 0 | 0 | 0 | 0 |
| 2 | 0 | 0 | ... | 0 | 0 | 0 | 0 | 0 | 0 |
| 3 | 0 | 0 | ... | 1 | 1 | 0 | 0 | 1 | 1 |
| 4 | 0 | 0 | ... | 0 | 0 | 0 | 0 | 0 | 1 |
| 5 | 0 | 0 | ... | 0 | 0 | 0 | 0 | 0 | 1 |
| 6 | 0 | 0 | ... | 0 | 0 | 0 | 0 | 0 | 1 |
| 7 | 0 | 1 | ... | 0 | 0 | 0 | 0 | 0 | 1 |
| BIT INDEX | 63 | 62 | ... | 3 | 2 | 1 | 0 | | |

FIG. 13
200

| WORD INDEX | ANTI-REPLAY WINDOW ||||||||  | WORD VALID BIT |
|---|---|---|---|---|---|---|---|---|---|
| | SEQUENCE NUMBER INDEX |||||||| | |
| 0 | 0 | 0 | ⋮ | 0 | 0 | 0 | 0 | 0 | 0 |
| 1 | 0 | 0 | ⋮ | 0 | 0 | 0 | 0 | 0 | 0 |
| 2 | 0 | 0 | ⋮ | 0 | 0 | 0 | 0 | 1 | 0 |
| 3 | 0 | 0 | ⋮ | 1 | 1 | 0 | 1 | 0 | 1 |
| 4 | 0 | 0 | ⋮ | 0 | 0 | 0 | 0 | 0 | 1 |
| 5 | 0 | 0 | ⋮ | 0 | 0 | 0 | 0 | 0 | 1 |
| 6 | 0 | 0 | ⋮ | 0 | 0 | 0 | 0 | 0 | 1 |
| 7 | 0 | 1 | ⋮ | 0 | 0 | 2 | 0 | 0 | 1 |
| BIT INDEX | 63 | 62 | ⋮ | 3 | 2 | 1 | 0 | | |

SIXTH PACKET RECEIVED

NEWLY RECEIVED PACKET SEQUENCE NUMBER = 511

MAXIMUM RECEIVED SEQUENCE NUMBER = 707

ANTI-REPLAY RANGE = 196–707

FIG. 14
200

SEVENTH PACKET RECEIVED

NEWLY RECEIVED PACKET SEQUENCE NUMBER = 579

MAXIMUM RECEIVED SEQUENCE NUMBER = 707

ANTI-REPLAY RANGE = 196–707

| WORD INDEX | ANTI-REPLAY WINDOW SEQUENCE NUMBER INDEX | | | | | | | | | WORD VALID BIT |
|---|---|---|---|---|---|---|---|---|---|---|
| 0 | 0 | 0 | 0 | 0 | ... | 0 | 0 | 0 | 0 | 0 |
| 1 | 0 | 0 | 0 | 0 | ... | 0 | 0 | • | 0 | 1 |
| 2 | 0 | 0 | 0 | 0 | ... | 0 | 0 | 0 | 1 | 0 |
| 3 | 0 | 0 | 1 | 0 | ... | 0 | 1 | 1 | 0 | 1 |
| 4 | 0 | 0 | 0 | 0 | ... | 0 | 0 | 0 | 0 | 1 |
| 5 | 0 | 0 | 0 | 0 | ... | 0 | 0 | 0 | 0 | 1 |
| 6 | 0 | 1 | 0 | 0 | ... | 0 | 0 | 0 | 0 | 1 |
| 7 | 63 | 62 | 0 | 0 | ... | 3 | 2 | 1 | 0 | 1 |
| BIT INDEX | 63 | 62 | | | ... | 3 | 2 | 1 | 0 | |

PACKET SEQUENCE NUMBER TRACKING FOR AN ANTI-REPLAY WINDOW

CROSS-REFERENCE TO RELATED APPLICATIONS

The subject matter of this application is related to U.S. patent application Ser. Nos. 12/430,438 filed Apr. 27, 2009, 12/729,226 filed Mar. 22, 2010, 12/729,231 filed Mar. 22, 2010, 12/782,379 filed May 18, 2010, 12/782,393 filed May 18, 2010, and 12/782,411 filed May 18, 2010, the teachings of all of which are incorporated herein in their entireties by reference.

BACKGROUND OF THE INVENTION

1. Field of the Invention

The present invention relates to communication systems, in particular, to data packet security using anti-replay protection.

2. Description of the Related Art

Internet Protocol Security (IPsec) is a set of protocols for securing Internet Protocol (IP) communications by authenticating and encrypting IP packets in a data stream. IPsec includes protocols for establishing mutual authentication and negotiation of cryptographic keys, which might protect data flows between two or more host devices (e.g., computers or servers), between a pair of security gateways (e.g., routers or firewalls), or between a security gateway and a host device. The IPsec protocol is officially specified by the Internet Engineering Task Force (IETF) in a series of Requests for Comment (RFC). For example, IETF RFC 2402 (1998), which is incorporated herein by reference, defines anti-replay protection for the IP Authentication Header protocol, which secures IP data flows against a security breach by a adversary inserting or replaying packets in the data flow. Although generally described herein in relation to the IPsec protocol, other network protocol standards, such as Secure Real-time Transport Protocol (SRTP), Transport Layer Security (TLS) and Secure Socket Layer (SSL) also define similar anti-replay protection.

In general, as described in RFC 2402, IPsec authentication provides anti-replay protection by assigning a unique sequence number to each encrypted packet. In the IPsec protocol, for example, the sequence number is a 64-bit number. Security association ("SA") anti-replay is a security service in which a receiving device can reject old or duplicate packets to protect itself against replay attacks. The transmitting device assigns a sequence number to each packet in a data stream in monotonically increasing order. In a packet-switched network, individual packets of a sequence of packets in the same data stream might take different paths between the transmitting device and the receiving device and, thus, packets might not arrive in the same order in which they were transmitted. Therefore, the receiving device tracks sequence numbers that it has received, and discards packets with a repeated sequence number. Since the sequence number can be a large number (e.g., 64 bits), the receiver does not track all the sequence numbers it has received, instead tracking only those sequence numbers that are within a sliding anti-replay window.

For example, a "position" of the sliding anti-replay window is determined based on the highest sequence number, X, that the receiving device has received. If N is the anti-replay window width, the receiving device will track whether it has received packets having sequence numbers from a low value of X−(N+1) through a high value of X, thus defining the anti-replay window between X−(N+1) and X. Any packet with a sequence number value less than X−(N+1) is discarded. The "position" of the window slides as the value of X changes as packets with higher sequence numbers are received. Common values of N are 32 and 64, although some devices support up to 1024.

However, in instances when the width, N, of the anti-replay window is small, valid packets might be discarded by the receiving device. Further, some Quality of Service (QoS) schemes might give priority to high-priority packets, which might cause some low-priority packets to be discarded even though they are within the anti-replay window. Although increasing the anti-replay window width does not affect system security, increasing the window width could increase costs or lower processing throughput of, for example, a network processing device. For example, if a barrel shifter is employed to store the contents of the anti-replay window, the larger the width of the anti-replay window, the higher the cost of the barrel shifter. Similarly, if the contents of the anti-replay window are stored in a memory and the window "slides" by updating a pointer to the memory, entries that are below the X−(N+1) threshold must be reset to zero by writing to the memory. As the size of the anti-replay window increases, the more memory cycles are consumed resetting the memory, which consumes memory bandwidth and could lower system throughput.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a network processor that includes a security sub-processor to prevent replay attacks on the network processor. A memory stores an anti-replay window corresponding to a data stream of the network processor. The anti-replay window has N bits initialized to correspond to data packet sequence numbers in the range 1 to N. The anti-replay memory is stored in a plurality of data words. A plurality of flip-flops store word valid bits corresponding to each of the data words. A multiplexer selects the word valid bit corresponding to a data word requested by the security processor, and an AND gate performs a bitwise AND operation between the selected data word and word valid bit. When the network processor receives a data packet, the security sub-processor determines a value of the received sequence number with respect to minimum and maximum values of a sequence number range of the anti-replay window.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows an exemplary anti-replay window employed by the network processor of FIG. 1, in accordance with embodiments of the present invention;

FIGS. 8-14 show an exemplary anti-replay window, operating in accordance with embodiments of the present invention, as a first through a seventh exemplary data packet are received.

DETAILED DESCRIPTION

In accordance with embodiments of the present invention, a network processor is provided that tracks sequence numbers of received data packets and provides variable anti-replay windows of sizes larger than the typical 32, 64 or 1024 sequence numbers. The network processor includes an anti-replay window memory for storing anti-replay windows, with the anti-replay windows divided into one or more data words. The network processor also includes a separate logic circuit for storing a Word Valid Bit corresponding to each data word of the anti-replay windows. The anti-replay window memory might include additional circuitry (e.g., transistors) to enable clearing of entire data words in a single clock cycle. To clear a data word, the Word Valid Bit corresponding to the data word is set to a corresponding logic level (e.g., logic '0'). Employing a separate logic circuit for storing the Word Valid Bits, embodiments of the present invention provide that one or more Word Valid Bits might be set to logic '0' in one clock cycle with no access to the anti-replay window memory while, in the same clock cycle, setting the corresponding bit of the data word representing a newly received data packet. Thus, the number of memory accesses and number of required clock cycles to update the anti-replay window are reduced, increasing system performance.

Figure 1:
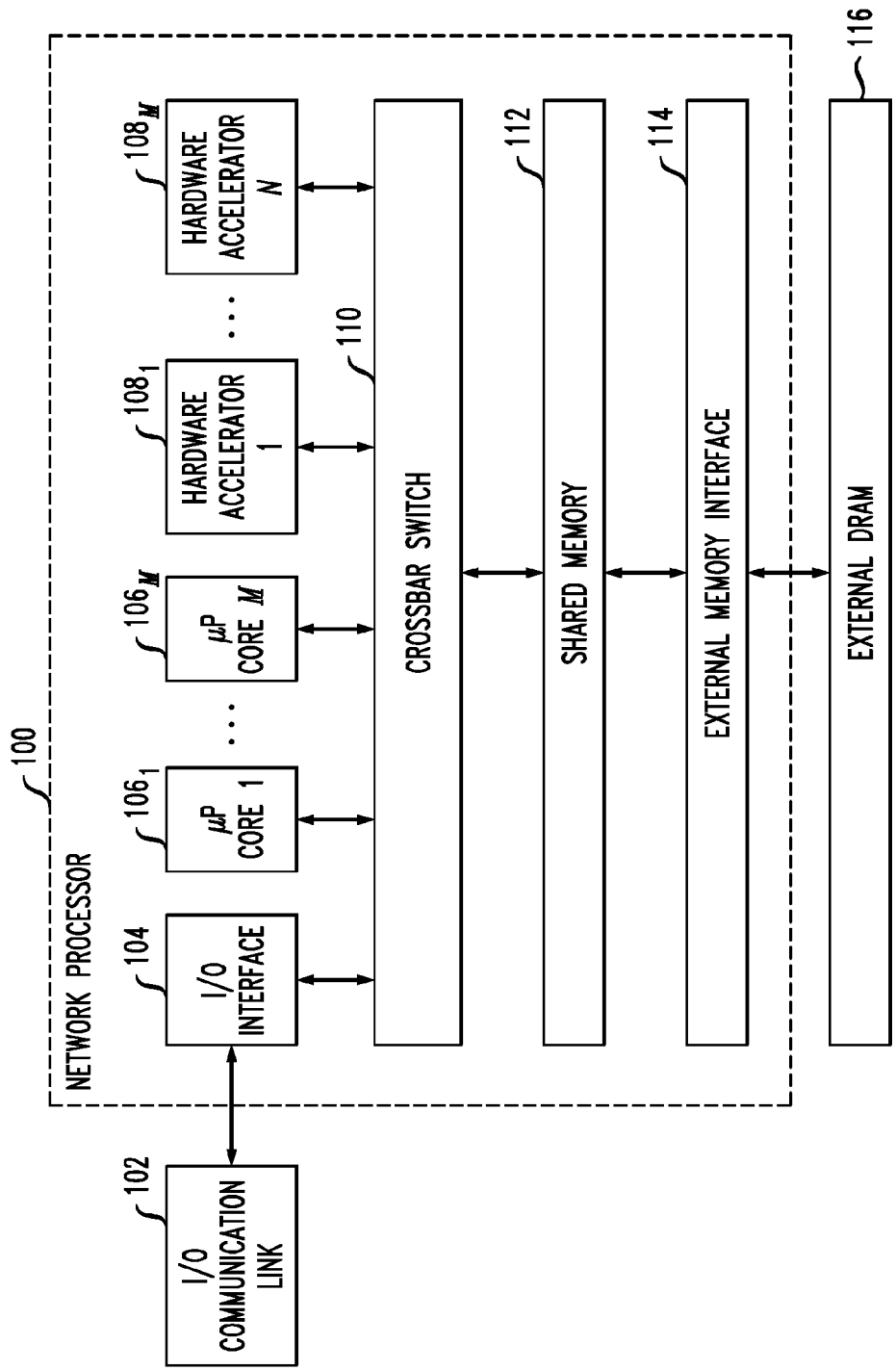
FIG. 1 shows a block diagram of a network processor, in accordance with exemplary embodiments of the present invention.

FIG. 1 shows a block diagram of an exemplary single-chip network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled to a switch system 110 that is then coupled to shared memory 112. In embodiments of the present invention, one or more of the various μP cores 106 and hardware accelerators 108 might be employed as a security processor to implement one or more security protocols such as IPsec.

I/O interface 104 might typically be implemented as hardware that connects Network Processor 100 to one or more external devices through I/O Communication link 102. I/O Communication link 102 might generally be employed for communication with one or more external devices, such as a computer system or a networking device, that interface with network processor 100. I/O Communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112.

In embodiments of the present invention, shared memory 112 is a conventional memory operating as a cache and might be allocated or subdivided. For example, shared memory 112 might include one or more FIFO queues that might be dynamically allocated to the various μP cores 106 and hardware accelerators 108. External memory interface 114 couples shared memory 112 to external DRAM 116 to provide off-chip storage of data not needed by the various μP cores 106 and hardware accelerators 108 to free space in shared memory 112. The μP cores and hardware accelerators might interact with each other as described in related U.S. patent application Ser. Nos. 12/782,379, 12/782,393, and 12/782,411, all filed May 18, 2010. Crossbar switch 110 might be a non-blocking crossbar switch such as described in related U.S. patent application Ser. Nos. 12/430,438 filed Apr. 27, 2009, 12/729,226 filed Mar. 22, 2010, and 12/729,231 filed Mar. 22, 2010.

As shown in FIG. 1, one or more data packets are transmitted from a transmitting device (not shown) to network processor 100, via communication link 102. Network processor might receive data packets from one or more active data streams concurrently. As described herein, where communication link 102 is coupled to a packet switched network, transmitted data packets might arrive at network processor 100 in an order different from the transmission order since, for example, each data packet might be routed over a different path through the network, or various nodes in the network might delay one or more packets for quality-of-service (QoS) requirements. Thus, as described herein, the transmitter appends a sequence number to each data packet indicating the order in which the packet was sent. Network processor 100 receives a stream of data packets corresponding to one or more data streams from communication link 102. I/O interface 104 might parse the received data packet and provide the received data packet, via crossbar switch 110, to a buffer in shared memory 112. The sequence number corresponding to the received data packet might be compared to an anti-replay window corresponding to the data stream of the received packet. The anti-replay window might be stored in a portion of shared memory 112 dedicated to storing security parameters, or the anti-replay window might be stored in a physically separate security memory dedicated only to storing security parameters and accessible only by those ones of μP cores 106 and hardware accelerators 108 that perform security processing.

FIG. 2 shows exemplary anti-replay window 200 in accordance with embodiments of the present invention. As described herein, received data packets of one or more active data streams of network processor 100 might be tracked with an anti-replay window such as shown in FIG. 2. As shown in FIG. 2, a large anti-replay window bit vector might be broken into multiple words in memory (e.g., shared memory 112 or a separate security memory). For example, an anti-replay window of width, N, equal to 512, might be stored as 8 data words of 64 bits each, such as shown in FIG. 2, although other anti-replay window widths, numbers of data words, and number of bits per data word are possible. For example, an anti-replay window having width N=65536 might be stored as 512 128-bit data words. For clarity, this specification will discuss only the exemplary anti-replay window shown in FIG. 2 having width N=512 and employing 8 64-bit data words, although the invention described herein is not so limited. As shown in FIG. 2, all of the bits in anti-replay window 200 are initially set to zero, indicating that network processor 100 has not yet received any data packet sequence numbers. Thus, as shown in FIG. 2, anti-replay window 200 is initially set to track a maximum sequence number equal to N (512 in the exemplary case of FIG. 2), and a minimum sequence number of 1. As shown in FIG. 2, bit 63 of data word 7 represents the maximum sequence number (512) and bit 0 of data word 0 represents the minimum sequence number (1).

As shown in FIG. 2, each data word of anti-replay window 200 might also have a corresponding Word Valid Bit, shown as 202(0)-202(7), and corresponding to word indices 0-7, respectively, of anti-replay window 200. As described herein, Word Valid Bits 202(0)-202(7) might be stored separately from anti-replay window 200, for example in separate flip-flops or registers. As shown in FIG. 2, each of Word Valid Bits 202(0)-202(7) are initially set equal to 1, indicating that the data in words 0-7 is valid.

Figure 3:
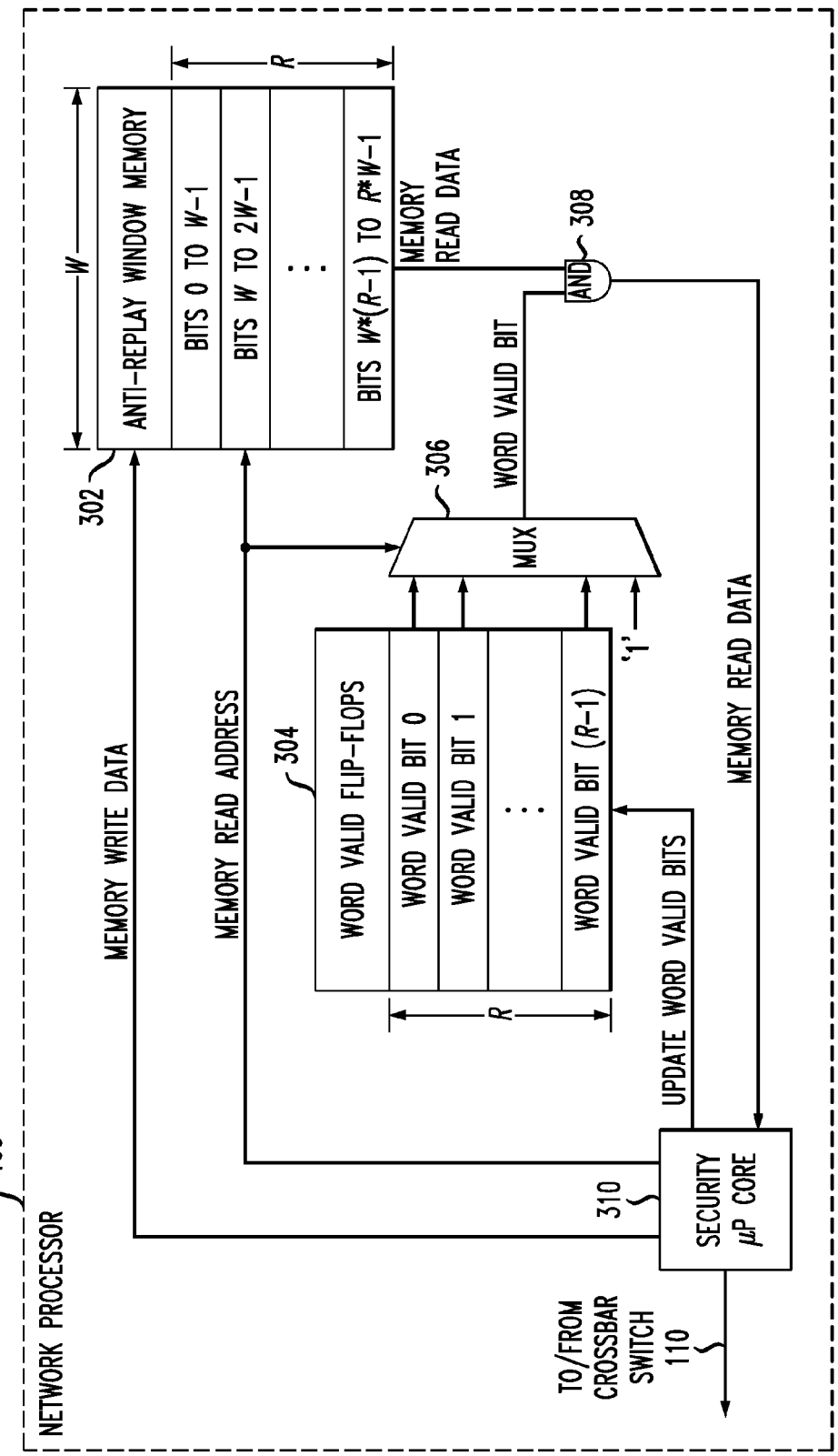
FIG. 3 shows an embodiment of a network processor employing an anti-replay window memory and word valid flip-flops, in accordance with exemplary embodiments of the present invention.

FIG. 3 shows an exemplary embodiment of network processor 100 employing an anti-replay window memory and flip-flops to store the word valid bits. In embodiments of the present invention, network processor 100 includes a processor core dedicated to performing security tasks, such as encryption, decryption, or tracking the anti-replay window, shown as Security μP Core 310. As shown, Security μP Core 310 is in communication with crossbar switch 110 of FIG. 1. As shown in FIG. 3, network processor 100 might also include anti-replay window memory 302, which is separate from shared memory 112 of FIG. 1. Anti-replay window memory might be accessible only to Security μP Core 310 to provide enhanced security. As described herein, anti-replay window memory 302 might be dedicated only for storing the anti-replay window, or might be employed as a shared memory for additional security data.

As shown in FIG. 3, anti-replay window memory 302 stores R data words of width W bits, where R*W=N, where N is the width of the anti-replay window. For example, as described in regard to FIG. 2, N=512, R=8 data words, and W=64 bits. Security μP Core 310 is in communication with anti-replay window memory 302, for example by a Memory Write Data signal to update a bit in a corresponding anti-replay window data word to indicate a sequence number has been received. Security μP Core 310 is also in communication with a plurality of Word Valid flip-flops, shown as 304. As shown, embodiments of the present invention include one Word Valid flip-flop for each data word in anti-replay window memory 302, shown as R in FIG. 3. Security μP Core 310 provides an Update Word Valid bits signal to Word Valid flip-flops 304 to update corresponding ones of the Word Valid bits.

Security μP Core 310 also provides a Memory Read Address signal to anti-replay window memory 302, for example to read a bit in the anti-replay window to determine whether the received sequence number is replayed or received for the first time. The Memory Read Address signal is also provided to multiplexer 306. Multiplexer 306 is an (R+1): 1 multiplexer, and selects a corresponding one of the Word Valid bits stored in Word Valid flip-flops 304 based upon the Memory Read Address signal. As shown, multiplexer 306 might have an additional input coupled to a logic '1' signal, which might be selected to bypass employing the Word Valid bits. The output of multiplexer 306 is provided to AND gate 308. AND gate 308 performs a bitwise logical AND operation between the selected data word of the anti-replay window memory and its corresponding Word Valid bit to provide the Memory Read Data signal to Security μP Core 310. Word Valid flip-flops 304 might alternatively be implemented as one or more registers of Security μP Core 310.

In embodiments of the present invention, although anti-replay window memory 302 might have physical storage space for R data words of width W bits, Security μP Core 310 might employ fewer than R data words. For example, embodiments of anti-replay window memory 302 might have physical storage space for R=512 data words with width W=128 bits, providing a maximum anti-replay window size of 65536. However, Security μP Core 310 might employ R'=8, such that only 8 data words of anti-replay window memory 302 are used, providing an anti-replay window size of 1024. Thus, embodiments of the present invention might provide variable anti-replay window sizes. For example, Security μP Core 310 might allocate less than the total size of anti-replay window memory 302 for the anti-replay window. Security μP Core 310 might determine the size of the anti-replay window based on a user setting of network processor 100, or based on measured performance of network processor 100. For example, the frequency with which packets outside the anti-replay window ("out-of-date" packets) are received might be tracked, and if packets are frequently dropped as out-of-date, Security μP Core 310 might increase the size of the anti-replay window to reduce the number of valid packets that are dropped as out-of-date.

Figure 4:
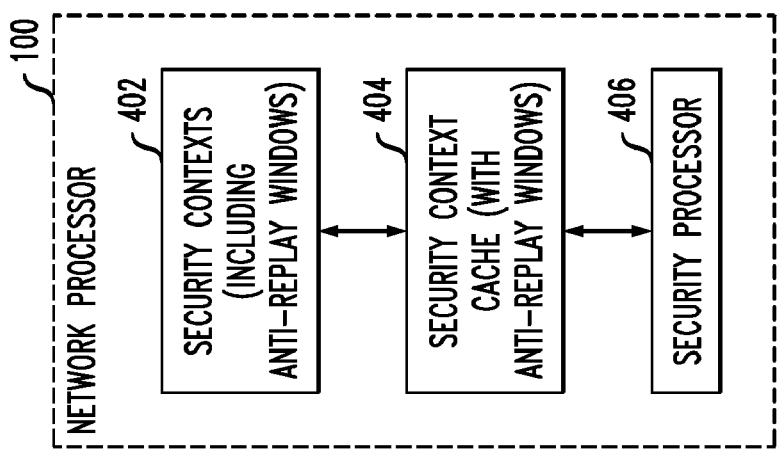
FIG. 4 shows an exemplary embodiment of a network processor and security memory, in accordance with exemplary embodiments of the present invention.

FIG. 4 shows an exemplary embodiment of network processor 100. As shown in FIG. 4, embodiments of the present invention include security memory 402 for storing security contexts. Storage 402 might be implemented, for example, in shared memory 112 of FIG. 1. Local cache 404 might be employed for temporarily storing security contexts that are in use by security processor 406. A security context is a data element that contains one or more security parameters, such as cipher and hash keys, for security processing related to one of the active data streams of network processor 100. For example, each active data stream of network processor 100 might have a corresponding security context stored in local cache 404. Security contexts for inactive data streams might be stored in context storage 402. As shown in FIG. 4, security context cache 404 might also be employed to store the anti-replay window for each active data stream.

Figure 5:
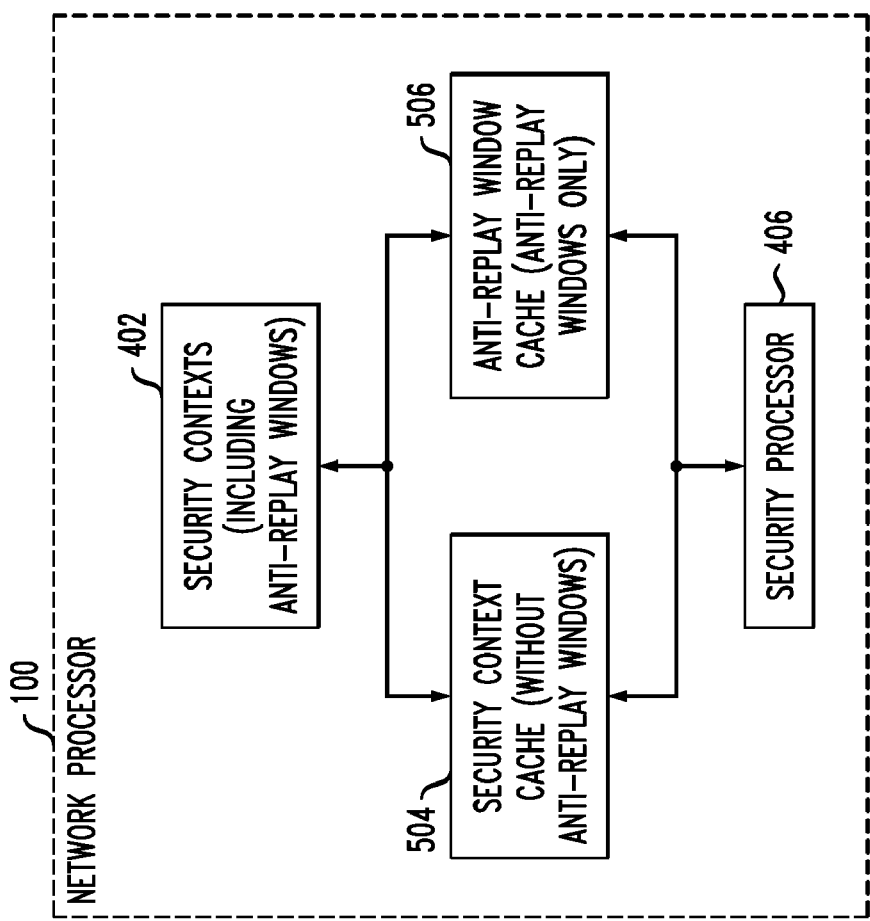
FIG. 5 shows another exemplary embodiment of a network processor and security memories, in accordance with exemplary embodiments of the present invention.

However, since the anti-replay window requires that its data words be cleared quickly, for example when the window is shifted and one or more data words are wholly or partially invalidated, embodiments of the present invention might employ a local cache for storing security contexts of active data streams, and a second local cache for storing anti-replay windows of active data streams. Such an embodiment is shown in FIG. 5. As shown in FIG. 5, network processor 100 might include security context cache 504 for storing security contexts of active data streams, and anti-replay window cache 506 for storing anti-replay windows of active data streams.

As shown in FIGS. 4 and 5, security processor 406 might allocate space in the local cache (e.g., 404 or 504 and 506) for a security context and anti-replay window when a corresponding data stream is active. Contexts and anti-replay windows for inactive data streams might be removed from the local cache and stored in storage 402 until needed. When needed, security processor 406 might retrieve inactive contexts and anti-replay windows from storage 402 for loading into the appropriate local cache.

Figure 6:
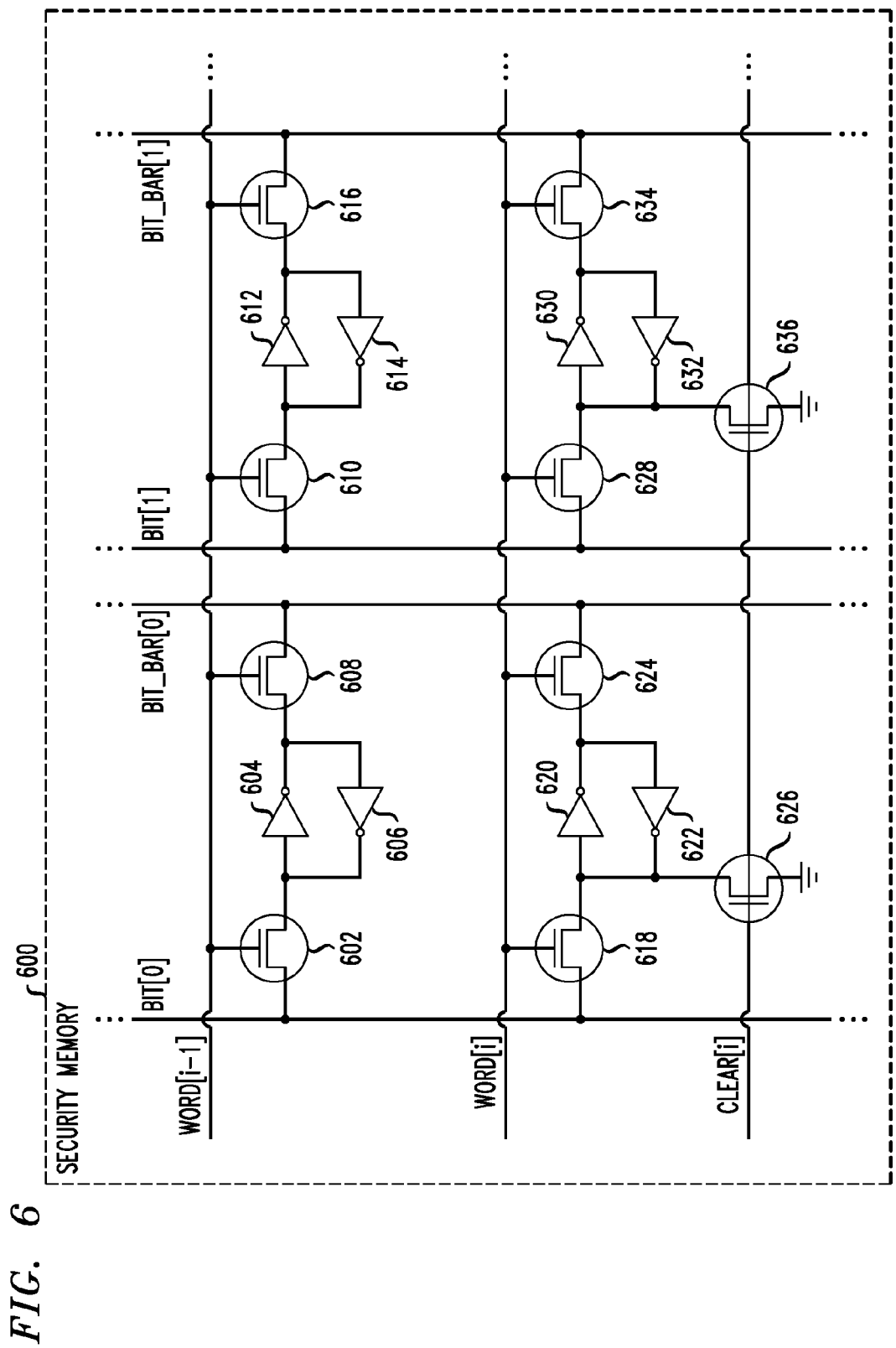
FIG. 6 shows an embodiment of a security memory, in accordance with exemplary embodiments of the present invention.

FIG. 6 shows an embodiment of a security memory cell, 600, such as might be employed for local cache 404 of FIG. 4. As shown in FIG. 6, a memory cell of security memory 600 includes i data words, where i is a positive integer. For simplicity, only bits 0 and 1 of memory cell 600 are shown in FIG. 6 but, as described herein, each data word of memory cell 600 might include W bits. As described in regard to FIG. 4, local cache 404 might be employed to store both security contexts and anti-replay windows. As shown in FIG. 6, data word [i−1] might be employed to store a security context, while data word [i] might be employed to store a data word of an anti-replay window.

As shown in FIG. 6, local cache 404 of FIG. 4, which stores both security contexts and anti-replay windows, might be implemented in two sections: a first section for storing security contexts and a second section for storing anti-replay windows. As described herein, the anti-replay window requires that its data words be cleared quickly, for example, when the window is shifted and one or more data words are wholly or partially invalidated. As shown in FIG. 6, to quickly clear an entire data word of an anti-replay window, the memory cells for storing anti-replay windows include additional field effect transistors (FETs) 626 and 636 for each bit in data word [i]. As shown, the gates of FETs 626 and 636 are coupled to each other, and to the CLEAR[i] signal. The drains of FETs 626 and 636 are coupled to the bit cell feedback inverters 620 and 622, and 630 and 632, respectively. The sources of FETs 626 and 636 are coupled to ground such that when the CLEAR[i] signal is asserted, each bit of data word [i] is reset to logic '0'. Thus, all bits of a data word can be reset to logic '0' in one clock cycle.

FETs 626 and 636 might be included only for data words of security memory 600 that are employed to store anti-replay windows, shown in FIG. 6 as data word [i]. Data word [i−1] does not include the additional FETs since data word [i−1] is used to store security contexts. Security memory 600 might also employ a word write mask, such that each bit of a data word can be written independently. The word write mask might be capable of overriding a CLEAR[i] signal, such that the bit corresponding to the new maximum sequence number can be set to logic '1' while also clearing the other bits.

Alternatively, as shown in FIG. 5, the local cache might be implemented as two physically separate memories, shown as 504 and 506. In such an embodiment, each data word of local cache 504, for storing security contexts only, might be implemented as shown in FIG. 6 for data word [i−1], while each data word of local cache 506, for storing anti-replay windows only, might be implemented as shown in FIG. 6 for data word [i].

Figure 7:
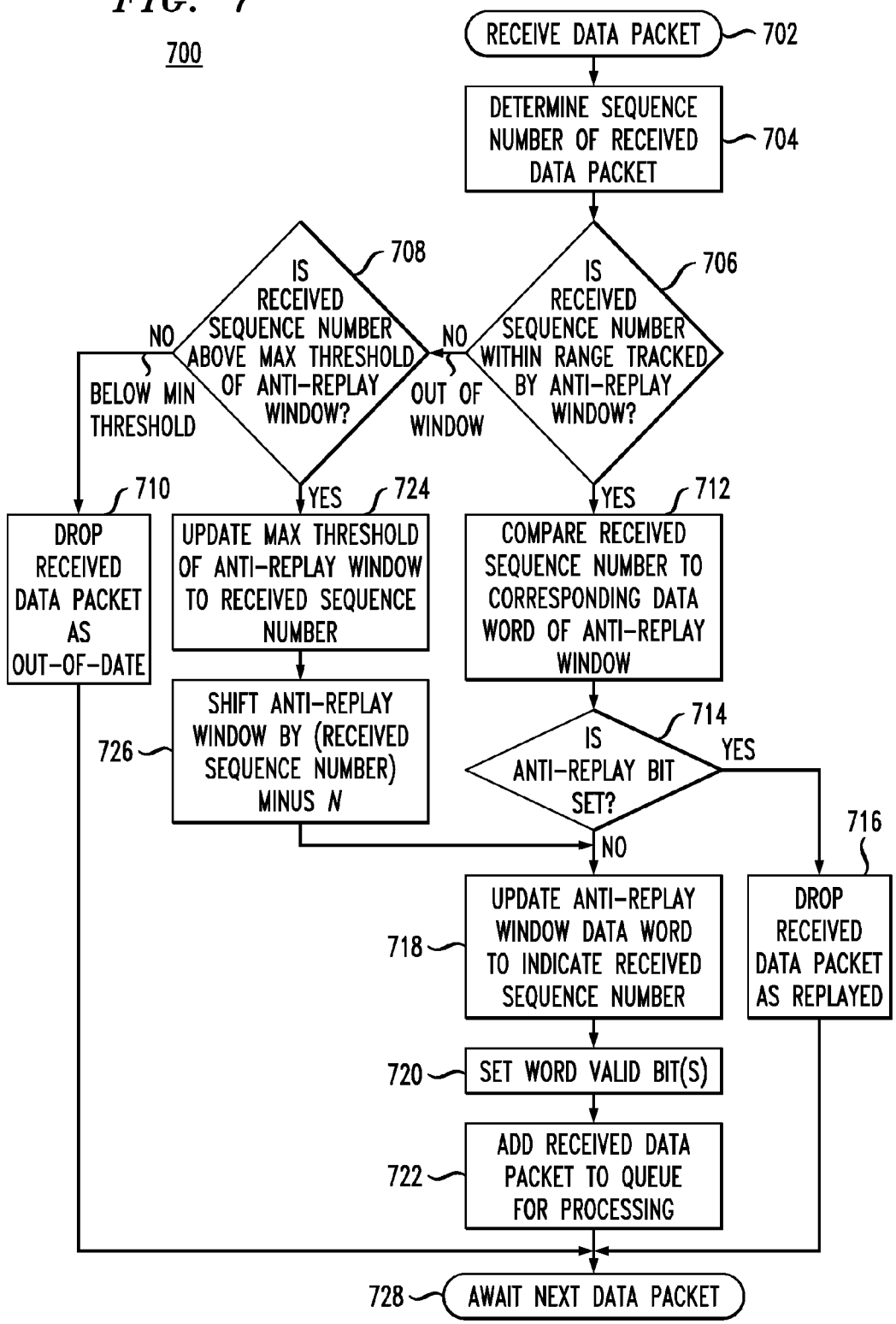
FIG. 7 shows a flow diagram of a process for anti-replay processing, in accordance with embodiments of the present invention.

FIG. 7 shows a flow diagram of anti-replay process 700, in accordance with embodiments of the present invention. At step 702 a data packet for an active data stream is received by network processor 100 and the anti-replay window corresponding to the data stream is determined. At step 704, the sequence number of the received data packet is determined. At step 706, a test determines whether the sequence number of the received data packet is within the range of the anti-replay window. If the sequence number is within the window range, processing continues to step 712. If the sequence number is not within the window range, processing continues to step 708.

If, at step 706, the sequence number is in the window range, then, at step 712, the received sequence number is compared to the anti-replay window data word that includes the bit corresponding to the received sequence number. At step 714, if the bit corresponding to the received sequence number had already been set, for example to logic '1', a packet having that sequence number was already received by network processor 100. Therefore, the received data packet is a replayed packet and, at step 716, the received data packet is discarded as a replayed packet. If, at step 714, the bit corresponding to the received sequence number was not set, the received packet is a newly received packet and, at step 718, the anti-replay data word is updated such that the bit corresponding to the received sequence number is set, indicating that the sequence number has been received.

At step 720, the Word Valid Bit for the updated data word is set, for example to logic '1', if necessary, thus indicating that the data word contains valid data. When the received sequence number is within the anti-replay window range, no data words need be invalidated and cleared, so no Word Valid Bits are set to logic '0' to clear one or more data words. At step 722, the received data packet is added to a queue for further processing by network processor 100. At step 728, the anti-replay process is idle until a next data packet is received.

If, at step 706, the sequence number is not within the window range, then, at step 708, it is determined whether the received sequence number is above the maximum threshold of the anti-replay window, or below the minimum threshold of the anti-replay window. At step 708, if the received sequence number is above the maximum threshold of the anti-replay window, processing continues to step 724. At step 724, the maximum threshold of the anti-replay window is updated to be equal to the received sequence number. At step 726, the anti-replay window is shifted by the received sequence number minus the width, N, of the anti-replay window. Thus, steps 724 and 726 effectively "slide" the anti-replay window range as higher sequence numbers are received. Steps 724 and 726 will be described in greater detail in regard to FIGS. 8-14. After the thresholds of the anti-replay window are updated at steps 724 and 726, processing continues to step 718, where the anti-replay data word is updated such that the bit corresponding to the received sequence number is set, indicating that the sequence number has been received.

Processing continues to steps 720, where one or more Word Valid Bits are updated. When the received sequence number is higher than the maximum threshold of the anti-replay window and the window range is updated, one or more of the data words corresponding to lower sequence numbers might need to be invalidated and cleared. To clear a data word, the Word Valid Bit corresponding to the data word is set to logic '0'. As shown in FIG. 3, the Word Valid Bits might be stored in flip-flops (304) such that one or more of the Word Valid Bits can be set to logic '0' in one clock cycle with no access to the anti-replay window memory (302). Embodiments of the present invention set the corresponding bit of the data word (step 718) and update the Word Valid Bits for any words that are now below the minimum window threshold (step 720) in a single clock cycle. Thus, the number of memory accesses and required clock cycles to update the anti-replay window are reduced, increasing system performance. Step 720 will be described in greater detail in regard to FIGS. 8-14.

Processing then continues to step 722. At step 722, the received data packet is added to a queue for further processing by network processor 100. At step 728, the anti-replay process is idle until a next data packet is received.

At step 708, if the received sequence number is below the maximum threshold of the anti-replay window, processing continues to step 710. At step 710, the received data packet is discarded as an out-of-date packet. Processing then continues to step 728. At step 728, the anti-replay process is idle until a next data packet is received.

FIGS. 8-14 show a series of exemplary anti-replay windows, updated in accordance with embodiments of the present invention, as a first through a seventh exemplary data packet are received. As described herein, FIG. 2 shows an initial state of exemplary anti-replay window 200, which is of width N=512 that is divided into 8 data words that are 64-bits long. Initially, all bits of all data words are set to logic '0' since no data packet has been received by network processor 100, and the Word Valid Bits are all set to logic '1' since all data in the anti-replay window is valid. The initial range of anti-replay window 200 is from a minimum sequence number of 1 to a maximum sequence number of 512. As described, bit 63 of data word 7 represents the maximum sequence number (512) and bit 0 of data word 0 represents the minimum sequence number (1).

FIG. 8 shows exemplary anti-replay window 200 when a first data packet, having a sequence number of 129, is received by network processor 100. As described in regard to FIG. 7, the received sequence number is within the range of anti-replay window 200. Therefore, at step 712, the bit of the anti-replay window corresponding to the received sequence number (129) is checked to determine whether the received sequence number is a replayed data packet. Initially, since each data word is 64 bits, sequence number 129 corresponds to bit 0 of data word 2, which is set to logic '1' at step 718. Since the anti-replay window has not shifted, and the Word Valid Bit corresponding to data word 2 is already set to logic '1', no update is necessary at step 720, and data packet 129 is queued for further processing by network processor 100 at step 722.

FIG. 9 shows anti-replay window 200 when a second data packet, having a sequence number of 511, is received by network processor 100. Again, the received sequence number is within the range of anti-replay window 200. Thus, at step 712 of FIG. 7, bit 62 of data word 7, which corresponds to sequence number 511, is set to logic '1' to indicate that sequence number 511 has been received. Bit 0 of data word 2, corresponding to sequence number 129, remains set to logic '1'. All the Word Valid Bits remain set to logic '1'. Data packet 511 is queued for further processing by network processor 100 at step 722.

FIG. 10 shows anti-replay window 200 when a third data packet, having a sequence number of 196, is received. Again, the received sequence number is within the range of anti-replay window 200. Thus, at step 712 of FIG. 7, bit 3 of data word 3, which corresponds to sequence number 196, is set to logic '1' to indicate that sequence number 196 has been received. Bit 0 of data word 2, corresponding to sequence number 129, and bit 62 of data word 7, corresponding to sequence number 511, remain set to logic '1'. All the Word Valid Bits remain set to logic '1'. Data packet 196 is queued for further processing by network processor 100 at step 722.

FIG. 11 shows anti-replay window 200 when a fourth data packet, having a sequence number of 707 is received. As described in regard to FIG. 7, the received sequence number is above the maximum threshold (512) of anti-replay window 200. Therefore, at steps 724 and 726 of FIG. 7, anti-replay window 200 must shift to represent a maximum sequence number of 707. To do this, anti-replay window 200 must shift by the received sequence number minus the anti-replay window width, in this case 707-512=195 bits. Thus, the first 195 bits of anti-replay window 200 must be invalidated. As shown in FIG. 11, the Word Valid Bits for data words 0, 1 and 2 (the first 192 bits) are set to logic '0', indicating that all the bits in the data word are logic '0', without actually writing values in anti-replay window memory 302. Thus, bit 0 of data word 1 remains set at logic '1' even though it is invalidated. In general, when a new maximum sequence number is received, the word valid bits for the first X data words of the anti-replay window will be set to logic '0', where X is equal to the quotient of $$\frac{\text{Sequence\#} - N}{W},$$

for example, (707−512)/64 results in a quotient of 3, while the remainder represents bits in data word 3.

The first three bits of data word 3 (bits 193-195) also are invalidated, with bit 2 of data word 3 now representing the maximum received sequence number (707). To invalidate bits 0 and 1 of data word 3, and to update bit 2 to represent sequence number 707, a bit mask of 4 might be written to data word 3 in memory. The Word Valid Bit for data word 3 remains set at logic '1'. Bit 3 of data word 3 represents the new minimum threshold of anti-replay window 200, which is now sequence number 196, which is still set to logic '1' based on the packet received as described in regard to FIG. 10. The bit corresponding to the new maximum sequence number is the highest bit of the invalidated group of bits.

Although not shown in anti-replay window 200, in operation, network processor 100 might store the value of the maximum received sequence number, and also might maintain a pointer indicating where the "wrap" occurs in the anti-replay window between the maximum sequence number and the minimum sequence number (bit 2 of data word 3 in FIG. 11). Data packet 707 is queued for further processing by network processor 100 at step 722 of FIG. 7.

FIG. 12 shows anti-replay window 200 when a fifth data packet, having a sequence number of 84 is received. As described in regard to FIG. 7, the received sequence number is below the minimum threshold of anti-replay window 200 (set to 196 as described in regard to FIG. 11). Thus, at step 710 of FIG. 7, the received data packet is discarded as an out-of-date packet. Since the received data packet is discarded, neither anti-replay window 200 nor the Word Valid Bits are updated, as indicated in FIG. 12.

FIG. 13 shows anti-replay window 200 when a sixth data packet, having a sequence number of 511 is received. As indicated by the strikethrough, at step 714 of FIG. 7, network processor 100 determines that sequence number 511 has already been received, since bit 62 of data word 7 was already set to logic '1', as described in regard to FIG. 9. Since the received data packet is discarded, neither anti-replay window 200 nor the Word Valid Bits are updated, as indicated in FIG. 13.

FIG. 14 shows exemplary anti-replay window 200 when a seventh data packet, having a sequence number of 579, is received by network processor 100. As described in regard to FIG. 8, the received sequence number is within the range of anti-replay window 200, which has shifted to include sequence numbers 196-707, as described in regard to FIG. 11. Therefore, at step 712, the bit of the anti-replay window corresponding to the received sequence number (579) is checked to determine whether the received sequence number is a replayed data packet. Here, since the anti-replay window has shifted, bit 2 of data word 1 corresponds to sequence number 579 as bit 0 of data word 0 corresponds to sequence number 513, from the initial maximum sequence number of 512. As shown in FIG. 14, bit 2 of data word 1 is updated to logic '1', for example by writing a bit mask of 4 to data word 1. The Word Valid Bit corresponding to data word 1 is set to logic '1' at step 720 since data word 1 now contains valid data. Data packet 579 is queued for further processing by network processor 100 at step 722 of FIG. 7.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method of preventing replay attacks on a network processor coupled to a packet-switched network, the method comprising:

initializing an anti-replay window for recording sequence numbers of received data packets;

storing the anti-replay window in a security memory having R data words, wherein the anti-replay window has N bits, and wherein each of the R data words has a width W bits, where R, W and N are positive integers, and R*W=N;

receiving a data packet having a sequence number appended to the data packet;

determining whether the received sequence number is within a range of the anti-replay window, wherein the range of the anti-replay window is determined by a maximum sequence number of the anti-replay window and a minimum sequence number of the anti-replay window;

i) if the received sequence number is within the range of the anti-replay window:

determining, based on a value of the anti-replay window corresponding to the received sequence number, whether the received sequence number corresponds to a replayed data packet;

if the received sequence number is not of a replayed data packet, updating the value of the anti-replay window corresponding to the received sequence number to indicate receipt of the sequence number;

setting a word valid bit corresponding to a data word including the updated value to indicate that the data word includes valid data; and providing the data packet for further processing by the network processor; otherwise, discarding the received data packet as a replayed data packet;

ii) if the received sequence number is greater than the maximum sequence number of the anti-replay window range:

shifting the anti-replay window by the received sequence number adjusted for a length of the anti-replay window by setting the word valid bits corresponding to the first X data words of the anti-replay window equal to zero, to indicate that the data word is invalid, wherein X equals the quotient of the received sequence number minus N, the difference divided by W;

updating the bit of the anti-replay window corresponding to the received sequence number to indicate that the sequence number is received;

setting the word valid bit corresponding to the data word including the updated bit to indicate that the data word includes valid data; and providing the data packet for further processing by the network processor;

wherein the step of updating the bit corresponding to the received sequence number comprises writing a bit mask to the anti-replay data window, wherein the bit corresponding to the received sequence number is equal to the received sequence number minus N, and wherein each bit of the bitmask is zero except for the bit corresponding to the received sequence number, and wherein the steps of i) shifting the anti-replay window, ii) updating the bit corresponding to the received sequence number, and iii) setting the word valid bits are performed in a single clock cycle of the network processor, and the bitmask is written to the anti-replay memory in a single write access of the anti-replay memory.

2. The invention recited in claim 1, further comprising:
iii) if the received sequence number is less than the minimum sequence number of the anti-replay window range, discarding the received data packet as an out-of-date data packet.

3. The invention recited in claim 1, wherein the anti-replay window has an initial sequence number range from 1 to N, each bit of the anti-replay window corresponding to a given one of the sequence numbers in the range 1 to N.

4. The invention recited in claim 3, further comprising:
if the received sequence number is greater than the maximum sequence number of the anti-replay window range:
shifting the range of the anti-replay window by the received sequence number minus N, thereby setting the maximum sequence number of the anti-replay window range equal to the received sequence number, and wherein the maximum sequence number of the anti-replay window corresponds to a bit of the anti-replay window having a position in the anti-replay window equal to the received sequence number minus N.

5. The invention recited in claim 1, wherein N is equal to 65536, R is equal to 512, and W is equal to 128 bits.

6. The invention recited in claim 1, wherein the anti-replay window is stored in a memory adapted to clear all the bits of one or more data words of the anti-replay window in a single clock cycle.

7. A non-transitory machine-readable storage medium, having encoded thereon program code, wherein, when the program code is executed by a machine, the machine implements a method of preventing replay attacks on a network processor coupled to a packet-switched network, the method comprising:
initializing an anti-replay window for recording sequence numbers of received data packets;
storing the anti-replay window in a security memory having R data words, wherein the anti-replay window has N bits, and wherein each of the R data words has a width W bits, where R, W and N are positive integers, and R*W=N;
receiving a data packet having a sequence number appended to the data packet;

determining whether the received sequence number is within a range of the anti-replay window, wherein the range of the anti-replay window is determined by a maximum sequence number of the anti-replay window and a minimum sequence number of the anti-replay window;

i) if the received sequence number is within the range of the anti-replay window:
determining, based on a value of the anti-replay window corresponding to the received sequence number, whether the received sequence number corresponds to a replayed data packet;
if the received sequence number is not of a replayed data packet,
updating the value of the anti-replay window corresponding to the received sequence number to indicate receipt of the sequence number;
setting a word valid bit corresponding to a data word including the updated value to indicate that the data word includes valid data; and
providing the data packet for further processing by the network processor; otherwise,
discarding the received data packet as a replayed data packet;

ii) if the received sequence number is greater than the maximum sequence number of the anti-replay window range:
shifting the anti-replay window by the received sequence number adjusted for a length of the anti-replay window by setting the word valid bits corresponding to the first X data words of the anti-replay window equal to zero, to indicate that the data word is invalid, wherein X equals the quotient of the received sequence number minus N, the difference divided by W;
updating the bit of the anti-replay window corresponding to the received sequence number to indicate that the sequence number is received;
setting the word valid bit corresponding to the data word including the updated bit to indicate that the data word includes valid data; and
providing the data packet for further processing by the network processor;

wherein the step of updating the bit corresponding to the received sequence number comprises writing a bit mask to the anti-replay data window, wherein the bit corresponding to the received sequence number is equal to the received sequence number minus N, and wherein each bit of the bitmask is zero except for the bit corresponding to the received sequence number, and wherein the steps of i) shifting the anti-replay window, ii) updating the bit corresponding to the received sequence number, and iii) setting the word valid bits are performed in a single clock cycle of the network processor, and the bitmask is written to the anti-replay memory in a single write access of the anti-replay memory.

8. The invention recited in claim 7, further comprising:
iii) if the received sequence number is less than the minimum sequence number of the anti-replay window range, discarding the received data packet as an out-of-date data packet.

* * * * *